US011966712B2

(12) United States Patent
Lee et al.

(10) Patent No.: US 11,966,712 B2
(45) Date of Patent: Apr. 23, 2024

(54) SERVER AND METHOD FOR PROVIDING MULTILINGUAL SUBTITLE SERVICE USING ARTIFICIAL INTELLIGENCE LEARNING MODEL, AND METHOD FOR CONTROLLING SERVER

(71) Applicant: GLOCALIZE INC., Seoul (KR)

(72) Inventors: Kug Koung Lee, Seoul (KR); Ho Kyun Kim, Seoul (KR); Bong Wan Kim, Seoul (KR)

(73) Assignee: GLOZ INC., Seoul (KR)

( * ) Notice: Subject to any disclaimer, the term of this patent is extended or adjusted under 35 U.S.C. 154(b) by 0 days.

(21) Appl. No.: 17/430,056

(22) PCT Filed: Jul. 8, 2021

(86) PCT No.: PCT/KR2021/008757
§ 371 (c)(1),
(2) Date: Aug. 11, 2021

(87) PCT Pub. No.: WO2023/282371
PCT Pub. Date: Jan. 12, 2023

(65) Prior Publication Data
US 2024/0005105 A1    Jan. 4, 2024

(30) Foreign Application Priority Data

Jul. 4, 2021 (KR) .................. 10-2021-0087498

(51) Int. Cl.
*G06Q 10/0639* (2023.01)
*G06F 40/58* (2020.01)
(Continued)

(52) U.S. Cl.
CPC .............. *G06F 40/58* (2020.01); *G06N 5/022* (2013.01); *G06Q 10/063112* (2013.01); *G06Q 10/06398* (2013.01)

(58) Field of Classification Search
None
See application file for complete search history.

(56) References Cited

U.S. PATENT DOCUMENTS

| 10,909,329 B2 * | 2/2021 | Gao ....................... G06N 3/044 |
| 2012/0316882 A1 * | 12/2012 | Fiumi .................... G10L 15/30 |
| | | 704/E15.001 |
| 2018/0373979 A1 * | 12/2018 | Wang ................ G06F 18/24143 |

FOREIGN PATENT DOCUMENTS

| CN | 102118643 A  * | 7/2011 |
| KR | 10-1802674 B1 | 11/2017 |

(Continued)

OTHER PUBLICATIONS

Kelvin Su et al "Show, Attend and Tell: Natural Image Caption Generation with Visual Attention" Apr. 2016, pp. 1-22 (Year: 2016).*

*Primary Examiner* — Romain Jeanty
(74) *Attorney, Agent, or Firm* — NKL Law; Jae Youn Kim

(57) ABSTRACT

Provided are a server and a method for providing a multilingual subtitle service using an artificial intelligence learning model, and a method for controlling the server. The server includes: a communication unit configured to perform data communication with either or both of a first user terminal device of a client requesting translation of a content image and a second user terminal device of a worker performing a translation task; a storage configured to store a worker search list based on learned worker information, and an artificial intelligence learning model for performing a worker's task performance evaluation; and a controller configured to input image information on the content image to the artificial intelligence learning model in accordance with a worker recommendation command of the client to acquire a worker list of workers capable of translating the (Continued)

content image, and control the communication unit to transmit the acquired worker list to the first user terminal device. The worker information includes at least one of: profile information on each worker, a subtitle content task-completed by each worker, and task grade information evaluated for each worker.

17 Claims, 12 Drawing Sheets

(51) Int. Cl.
*G06N 5/022* (2023.01)
*G06Q 10/0631* (2023.01)

(56) References Cited

FOREIGN PATENT DOCUMENTS

| | | |
|---|---|---|
| KR | 10-2019-0141331 A | 12/2019 |
| KR | 10-2020-0142282 A | 12/2020 |
| KR | 10-2244448 B1 | 4/2021 |
| KR | 10-2258000 B1 | 5/2021 |
| WO | WO-2020251122 A1 * | 12/2020 |

\* cited by examiner

1000

100

SERVER AND METHOD FOR PROVIDING MULTILINGUAL SUBTITLE SERVICE USING ARTIFICIAL INTELLIGENCE LEARNING MODEL, AND METHOD FOR CONTROLLING SERVER

BACKGROUND OF THE DISCLOSURE

Field of the Disclosure

The present disclosure relates to a server and a method for providing a multilingual subtitle service using an artificial intelligence learning model, and a method for controlling the server, and more particularly, to a service system capable of providing a multilingual subtitle service by providing a dedicated multilingual subtitle content creating tool for an online content image, the tool which is capable of integrally requesting and performing a task on a subtitle content with respect to various content images, and a method for controlling a server thereof.

Related Art

With the development of the Internet, various content images can be produced and played back, and users from various countries are able to watch the content images easily and quickly. Accordingly, creators of the content images translate source languages included in the content images into various languages so that users in different countries can watch the content images more conveniently.

However, there is a limit to the creators themselves in translating into various languages, and when translation is requested to a translator, information on the translator is insufficient, and thus, it may be translated with a word or expression possibly understood as a different meaning from the content image or it may take a lot of time to find a translator who can translate into a language requested by a client.

Therefore, various methods for easier and faster translation of content images should be sought.

SUMMARY

The present disclosure provides a subtitle service that can integrally request and perform a task on a subtitle content for a content image.

In an aspect, there is provided a server providing a subtitle service, and the server includes: a communication unit configured to perform data communication with either or both of a first user terminal device of a client requesting translation of a content image and a second user terminal device of a worker performing a translation task; a storage configured to store a worker search list based on learned worker information, and an artificial intelligence learning model for performing a worker's task performance evaluation; and a controller configured to input image information on the content image to the artificial intelligence learning model in accordance with a worker recommendation command of the client to acquire a worker list of workers capable of translating the content image, and control the communication unit to transmit the acquired worker list to the first user terminal device. The worker information includes at least one of: profile information on each worker, a subtitle content task-completed by each worker, and task grade information evaluated for each worker.

In addition, the artificial intelligence learning model may include: a data learner configured to learn worker information stored in the storage, and classify a translatable field category for each worker based on the learned worker information; and a data acquirer configured to acquire a worker list of workers capable of translating the content image based on the image information and the worker information learned through the data learner.

In addition, the controller may be further configured to: in response to receiving translation request information comprising at least one of worker request information, task condition information, and image information, input the image information to the artificial intelligence learning model and transmit the worker list acquired through the data acquirer to the first user terminal device; and in response to receiving a command to select at least one worker included in the worker list from the first user terminal device, control the communication unit to transmit a task assignment message to a second user terminal device of a worker corresponding to the selection command. The image information may include at least one of address information, title information, and description information on the content image.

The controller may be further configured to, in response to receiving translation request information comprising at least one of an automatic translation command, task condition information, and image information from the first user terminal device, acquire the content image based on address information included in the image information, extract audio data from the image frame, and input the extracted audio data to the artificial intelligence learning model. The artificial intelligence learning model may further include a language recognizer configured to recognize a first language related to the input content data. The data acquirer may be further configured to acquire a second language requested by the client from the first language recognized through the language recognizer.

In addition, the artificial intelligence learning model may further include a translation reviewer configured to convert the second language acquired through the data acquirer or a language corresponding to a subtitle content updated in the storage into a language appropriate to context based on previously learned subtitle contents.

In addition, the data acquirer may be further configured to acquire a task level value of the worker who has worked on the subtitle content, by using at least one of: an error correction review result from the translation reviewer regarding the updated subtitle content, task period information on the subtitle content, and evaluation information by a user who has used the subtitle content.

In addition, the controller may include: a task creator configured to, in response to receiving translation request information comprising at least one of task condition information and image information from the first user terminal device, determine as to validity of the content image based on the image information, generate task information related to the translation request information of which validity is verified, and store the task information; and a task executor configured to provide a subtitle content creating tool for a translation task for a content image related to at least one item of translation request information stored in the storage to the second user terminal device, and, in response to receiving a subtitle content on which the translation task has been completed from the second user terminal device, store the subtitle content in the storage. The image information may include at least one of address information, title information, and description information on the content image.

In addition, the storage may include: a temporary storage configured to store the subtitle content on which the translation task has been completed; and a final storage configured to store a subtitle content on which translation review has been completed among subtitle contents stored in the temporary storage. The task executor may be further configured to provide a third user terminal device of a reviewer with a review tool for translation review for a language included in at least one subtitle content stored in the temporary storage, and, in response to receiving a review completion message from the third user terminal device, store in the final storage the subtitle content on which translation review has been completed.

In addition, the controller may further include a member manager configured to, in response to receiving a registration request command from a second user terminal device of an unregistered worker, generate task grade information of the unregistered worker by evaluating test performance of the unregistered worker, generate profile information comprising personal information, history information, cost information, and evaluation information provided from the unregistered worker, and store the profile information in the storage.

In another aspect, there is provided a method for providing a subtitle service using an artificial intelligence learning model in a server, and the method includes: performing data communication with either or both of a first user terminal device of a client requesting translation of a content image and a second user terminal device of a worker performing the translation; inputting image information on the content image to the artificial intelligence learning model in accordance with a worker recommendation command of the client; acquiring, through the artificial intelligence learning model, a worker list of workers capable of translating the content image; and transmitting the acquired worker list to the first user terminal device. The worker information includes at least one of: profile information on each worker, a subtitle content task-completed by each worker, and task grade information evaluated for each worker.

In addition, the acquiring may comprise learning, through a data learner of the artificial intelligence learning model, worker information stored in the storage, classifying a translatable field category for each worker based on the learned worker information, and inputting the learned worker information and image information to a data acquirer of the artificial intelligence learning model to acquire a worker list of workers capable of translating the content image.

In addition, the inputting further may include: in response to receiving translation request information comprising at least one of worker request information, task condition information, and image information, inputting the image information to the artificial intelligence learning model; and in response to receiving a command to select at least one worker included in the worker list from the first user terminal device, transmitting a task assignment message to a second user terminal device of a worker corresponding to the selection command. The image information may include at least one of address information, title information, and description information on the content image.

In addition, the inputting may further include: in response to receiving translation request information comprising at least one of an automatic translation command, task condition information, and image information from the first user terminal device, acquiring the content image based on address information included in the image information to input the content image to a language recognizer of the artificial intelligence learning model; and in response to recognizing a first language related to audio data of the content image through the language recognizer, inputting the first language to the data acquirer to acquire a second language requested by the client from the first language.

In addition, the method may further include converting, at a translation reviewer of the artificial intelligence learning model, the second language or a language corresponding to a subtitle content updated in the storage into a language appropriate to context based on previously learned subtitle contents.

In addition, the method may further include acquiring, at the data acquirer, a task level value of a worker who has worked on the subtitle content, by using at least one of: an error correction review result from the translation reviewer regarding the updated subtitle content, task period information on the subtitle content, and evaluation information by a user who has used the subtitle content.

In yet another aspect, there is provided a method for controlling a server providing a subtitle service, and the method includes: receiving translation request information comprising at least one of task condition information and image information from a first user terminal device of a client; after determining as to validity of the content image based on the image information, storing the translation request information of which validity has been verified; in accordance with a worker's request, transmitting a subtitle content creating tool for a translation task for a content image related to at least one item of translation request information stored in the storage to a second user terminal device of a worker; and in response to receiving a subtitle content on which a translation task has been completed from the second user terminal device, storing the subtitle content. The image information include at least one of address information, title information, and description information on the content image.

In addition, the storing may include: storing, in a temporary storage, the subtitle content on which the translation task has been completed; in response to a request from a reviewer, transmitting, to a third user terminal device of the reviewer, a review tool for translation review for a language included in at least one subtitle content stored in the temporary storage; and in response to receiving a review completion message from the third user terminal device, storing in the final storage a subtitle content on which translation review has been completed.

In addition, the method may further include: registering worker information comprising profile information and task grade information on an unregistered worker; and updating the registered worker information. The registering may include: generating the profile information comprising at least one of personal information, history information, cost information, and evaluation information on the unregistered worker; and in response to receiving a registration request command from a second user terminal device of the unregistered worker, generating task grade information of the unregistered worker by evaluating test performance of the unregistered worker. The updating may include updating the task grade information of the registered worker by using at least one of work period information, error correction information, and evaluation information by a user who has used the subtitle content on which the translation task has been completed by the registered worker.

As described above, according to various embodiments of the present disclosure, the server providing the subtitle service may provide the subtitle service capable of integrally requesting and performing a task on a subtitle content for a content image through an artificial intelligence learning model.

In addition, in the present disclosure, with respect to video contents distributed online in various resource forms, by providing a subtitle service dedicated tool that can be effectively used by a client who requests a subtitle content task including a source-language and target-language task, a worker who performs the source-language and target-language task, and a reviewer who verifies the quality of a generated subtitle content, it is possible to improve productivity of subtitle contents.

In addition, in the present disclosure, as a subtitle service that intermediaries a subtitle content worker, a subtitle content client, and a subtitle content reviewer is provided in the server, it is possible to provide a new revenue model for the worker and the reviewer and to reduce the cost of creating a subtitle content for the client.

DESCRIPTION OF EXEMPLARY EMBODIMENTS

Figure 1:
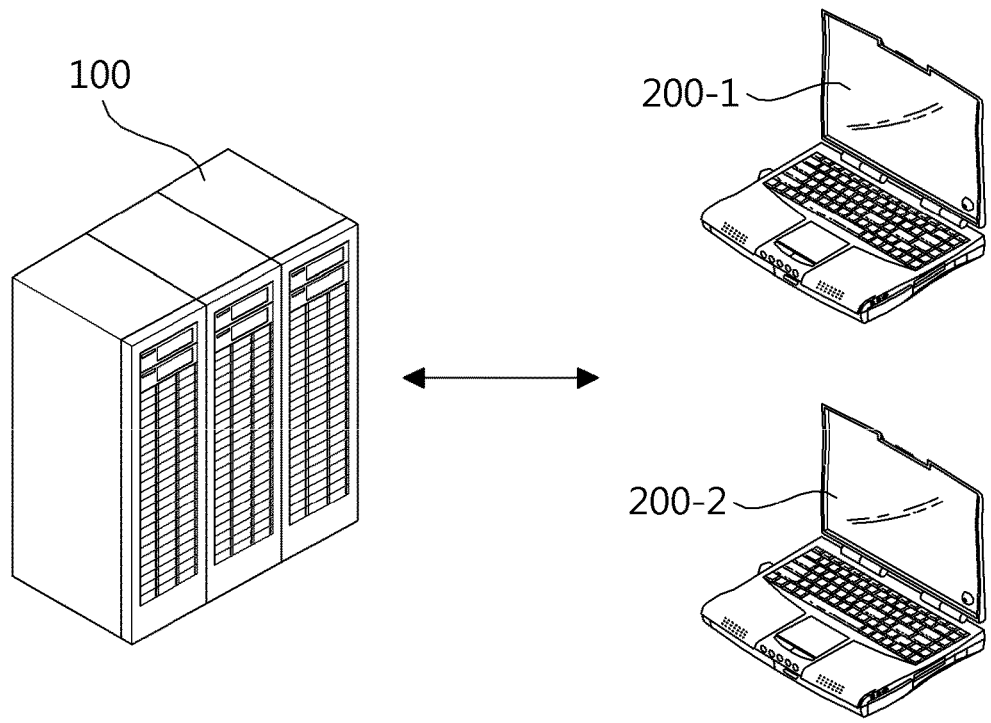
FIG. 1 is an exemplary diagram of a subtitle service system according to an embodiment of the present disclosure.

Hereinafter, various embodiments of this document will be described with reference to the accompanying drawings. However, it should be understood that technology described in this document is not limited to a specific embodiment and includes various modifications, equivalents, and/or alternatives of an embodiment of this document. The same reference numbers are used throughout the drawings to refer to the same or like parts.

In this document, an expression such as "have," "may have," "comprise," or "may comprise" indicates existence of a corresponding characteristic (e.g., constituent element such as a numerical value, function, operation, or component) and does not exclude the presence of another characteristic.

In this document, an expression such as "A or B", "at least one of A or/and B", or "one or more of A or/and B" may include all possible combinations of together listed items. For example, "A or B," "at least one of A and B," or "one or more of A or B" may indicate all of (1) a case of including at least one A, (2) a case of including at least one B, and (3) a case of including both at least one A and at least one B.

An expression such as "first" and "second" used in this document may indicate various constituent elements regardless of order and/or importance, is used for distinguishing a constituent element from another constituent element, and does not limit corresponding constituent elements.

When it is described that a constituent element (e.g., a first constituent element) is "(operatively or communicatively) coupled with/to" or is "connected to" another constituent element (e.g., a second constituent element), it should be understood that the constituent element may be directly connected to the another constituent element or may be connected to the another constituent element through another constituent element (e.g., a third constituent element). However, when it is described that a constituent element (e.g., a first constituent element) is "directly connected" or is "directly accessed" to another constituent element (e.g., a second constituent element), it may be understood that another constituent element (e.g., a third constituent element) does not exist between the constituent element and the other constituent element.

An expression "configured to" used in this document may be interchangeably used with, for example, "suitable for", "having the capacity to", "designed to", "adapted to", "made to", or "capable of" according to a situation. A term "configured to" does not always mean "specifically designed to" in hardware. Alternatively, in any situation, an expression "device configured to" may mean that the device is "capable of" being configured together with another device or component. For example, a "processor configured to perform phrases A, B, and C" may be a generic-purpose processor (e.g., CPU or application processor) that executes an exclusive processor (e.g., an embedded processor) for performing a corresponding operation or at least one software program stored at a memory device to perform a corresponding operation.

An electronic device according to various embodiments of this document may include at least one of, for example, a smart phone, tablet personal computer (tablet PC), mobile phone, video phone, e-book reader, desktop PC, laptop PC, netbook computer, workstation, server, personal digital assistant (PDA), portable multimedia player (PMP), moving picture experts group layer-3 (MP3) player, mobile medical device, camera, and wearable device. According to various embodiments, the wearable device may include at least one of an accessory type device (e.g., watch, ring, bracelet, ankle bracelet, necklace, glasses, contact lens), head-mounted-device (HMD), textile or clothing integral type device (e.g., electronic clothing), body attachment type device (e.g., skin pad or tattoo), and bio implanted type device (e.g., implantable circuit). In an embodiment, the electronic device may include at least one of, for example, a television, digital video disk (DVD) player, audio device, refrigerator, air-conditioner, cleaner, oven, microwave oven, washing machine, air cleaner, set-top box, home automation control panel, security control panel, television box (e.g., Samsung HomeSync™, AppleTV™, or Google TV™), game console (e.g., Xbox™, Play Station™), electronic dictionary, electronic key, camcorder, and electronic frame.

In another embodiment, an electronic device may include at least one of various medical devices (e.g., various portable medical measurement devices (blood sugar measurement device, heartbeat measurement device, blood pressure measurement device, or body temperature measurement device), magnetic resonance angiography (MRA) device, magnetic resonance imaging (MM) device, computed tomography (CT) device, scanning machine, and ultrasonic wave device), navigation device, global navigation satellite system (GNSS), event data recorder (EDR), flight data recorder (FDR), vehicle infotainment device, ship electronic equipment (e.g., ship navigation device, gyro compass), avionics, security device, vehicle head unit, industrial or home robot, automatic teller's machine (ATM) of a financial institution, point of sales (POS) of a store, and Internet of things (e.g., bulb, various sensors, electricity or gas meter, sprinkler, fire alarm, thermostat, street light, toaster, exercise mechanism, hot water tank, heater, boiler).

In this document, a term "user" may indicate a person using an electronic device or a device (e.g., artificial intelligence electronic device) using an electronic device.

FIG. 1 is an exemplary diagram of a subtitle service system according to an embodiment of the present disclosure.

As shown in FIG. 1, a subtitle service system 1000 may include a server 100 providing a subtitle service, and first and second user terminal devices 200-1 and 200-2.

The server 100 may be a server that provides various services for a project requested by a client.

Here, the project may be to create a subtitle content of an original language (hereinafter, referred to as a source language) of a content image requested by the client, or to create a subtitle content translated from the source language of the content image into a target language requested by the client.

The first user terminal device 200-1 may be a terminal device of the client who requests a translation task for a content image, and the second user terminal device 200-2 may be a terminal device of a worker who performs the translation task for the content image requested by the client.

The first and second user terminal devices 200-1 and 200-2 may be Internet-enabled electronic devices such as desktops, laptops, tablet PCs, and smart phones.

According to an embodiment, when a worker recommendation command is received from the first user terminal device 200-1 of the client, the server 100 providing the subtitle service may input image information on the content image requested by the client to an artificial intelligence learning model to acquire a worker list of workers capable of translating the content image, and may transmit the acquired worker list to the first user terminal device 200-1 of the client.

Accordingly, the client may select a worker for the content image from the worker list displayed through the first user terminal device 200-1.

When a command to select a worker selected by the client is received from the first user terminal device 200-1, the server 100 may transmit a task assignment message for the translation task for the content image requested by the client to a second user terminal device 200-2 of the corresponding worker.

Accordingly, the worker may access the server 100 through the second user terminal device 200-2 to perform the translation task for the content image requested by the client.

According to another embodiment, when an automatic translation command for the content image requested by the client is received from the first user terminal device 200-1 of the client, the server 100 may input the corresponding content image to the artificial intelligence learning model, recognize a first language related to audio data from an audio content included in the content image, and automatically translate the recognized first language into a second language requested by the client.

According to another embodiment, when a user command related to a translation request is received from the first user terminal device 200-1 of the client, the server 100 may determine as to validity of the content image requested by the client, and then generate and store task information related to the corresponding content image.

Accordingly, the worker may check the task information stored in the server 100 through the second user terminal device 200-2 and perform the translation task for the content image requested by the client.

So far, an operation of the subtitle service system 1000 according to the present disclosure has been schematically described. Hereinafter, operations to be performed by the server 100 and the first and second user terminal devices 200-1 and 200-2 in the subtitle service system 1000 according to the present disclosure, will be described in more detail.

Figure 2:
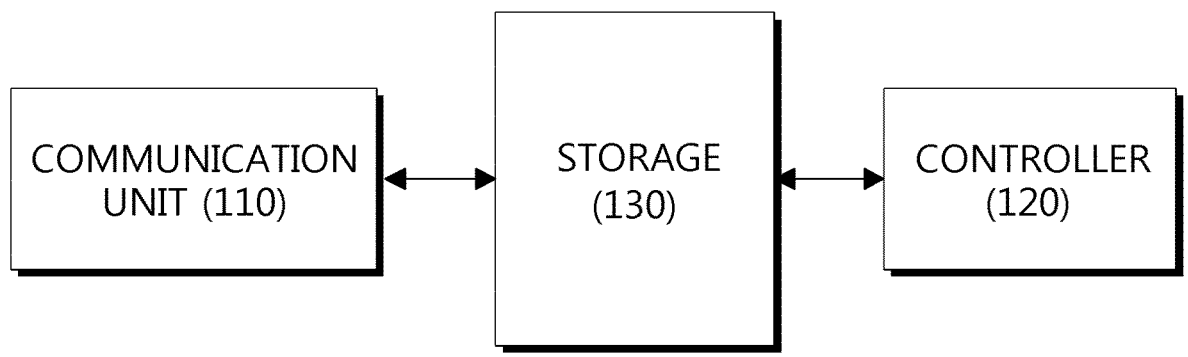
FIG. 2 is a block diagram of a server providing a subtitle service according to an embodiment of the present disclosure.

FIG. 2 is a block diagram of a server providing a subtitle service according to an embodiment of the present disclosure.

As shown in FIG. 2, the server 100 providing a subtitle service may include a communication unit 110, a storage 120, and a controller 130.

The communication unit 110 may perform data communication with either or both of a first user terminal device 200-1 of a client requesting a translation task for a content image and a second user terminal device 200-2 of a worker performing the translation task.

According to an embodiment, the communication unit 110 may perform data communication with the first and second user terminal devices 200-1 and 200-2 through connection to an external network according to a wireless communication protocol such as IEEE, or may perform data communication with the first and second user terminal devices 200-1 and 200-2 through a relay device (not shown).

The storage 120 may store a worker search list based on the learned worker information and an artificial intelligence learning model for performing task performance evaluation of the worker.

Here, the worker information may include at least one of a subtitle content task-completed by each worker and task grade information evaluated for each worker.

The controller 130 may control the overall operation of each component constituting the server 100. In particular, the controller 130 may input image information on the content image to the artificial intelligence learning model in accordance with a worker recommendation command of the client to acquire a worker list of workers capable of translating the content image, and may control the communication unit 110 to transmit the acquired worker list to the first user terminal device 200-1.

Here, the content image may be in the format of a video file such as MP4, AVI, or MOV, and the artificial intelligence learning model may be an artificial intelligence model that learns worker information stored in the storage 120, classifies a translatable field category for each worker based on the learned worker information, and provides a worker list of workers capable of translating the content image requested by the client in the classified category.

Hereinafter, an operation in which the artificial intelligence learning model learns information stored in the storage 120 and outputs a result based on the learned information and input information will be described in detail with reference to FIGS. 3 and 4.

Figure 3:
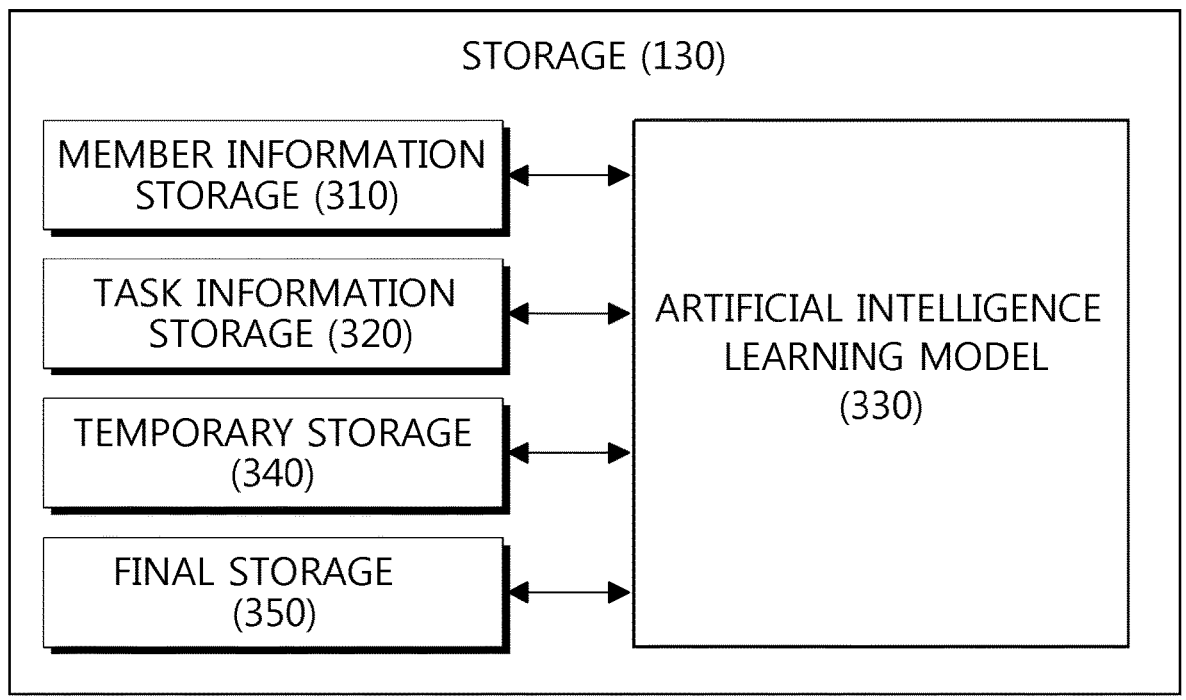
FIG. 3 is a detailed block diagram of a storage according to an embodiment of the present disclosure.
Figure 4:
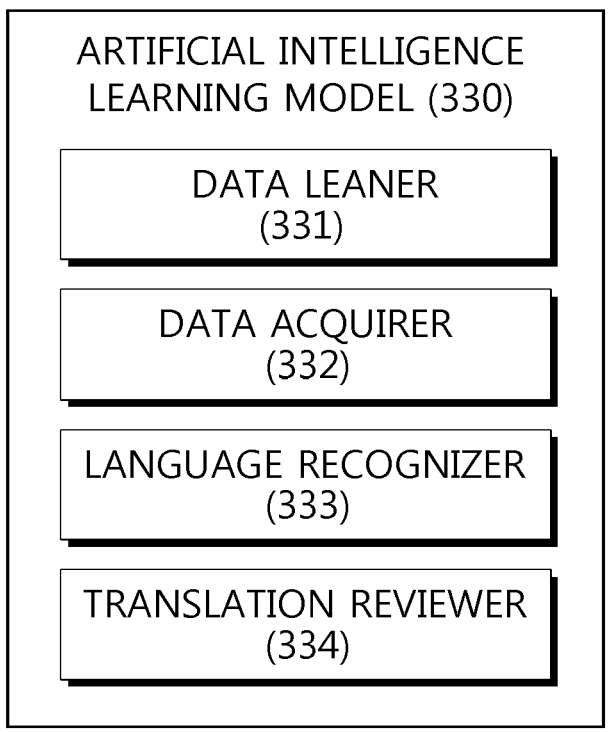
FIG. 4 is a detailed block diagram of an artificial intelligence learning model according to an embodiment of the present disclosure.

FIG. 3 is a detailed block diagram of a storage according to an embodiment of the present disclosure, and FIG. 4 is a detailed block diagram of an artificial intelligence learning model according to an embodiment of the present disclosure.

As shown in FIG. 3, the storage 120 may include a member information storage 310, a task information storage 320, an artificial intelligence learning model 330, a temporary storage 340, and a final storage 350.

The member information storage 310 may store profile information for all pre-registered members. Here, the pre-registered members may include a client who requests a translation task for a content image, a worker who performs the translation task requested by the client, and an reviewer who verifies (reviews) a subtitle content on which the task is completed by the worker.

Profile information of members may include at least one of ID information, contact information, email information, payment information, gender, and age information on each pre-registered member. Meanwhile, when a member is a worker or reviewer, the member information storage 310 may further store worker information including at least one of task grade information and history information in addition to profile information of the worker or reviewer.

The task information storage 320 may store task information that is generated in relation to translation request information for a content image requested by a pre-registered client.

Here, the translation request information may include at least one of worker request information, task condition information, and image information, and the image information may include at least one of address information, title information, and description information on the content image requested by the client. In addition, the description information may be detailed information on the content image, and the subtitle condition information may include at least one of a target language for translation, a requested translation completion date, a translation cost, a worker grade, and translation difficulty information. In addition, the translation request information may include a content image file.

Meanwhile, the task information storage 320 may classify and store information on a task unassigned to a worker, information on a task assigned to a worker, and information on a task completed by the worker.

The artificial intelligence learning model 330 may learn the profile information of members stored in the member information storage 310 and the task information stored in the task information storage 320, and may provide various services related to a translation task based on the learned information.

The temporary storage 340 may temporarily store a subtitle content translated by the worker or a subtitle content automatically translated through the artificial intelligence learning model 330, and the final storage 350 may store a subtitle content of which verification has been completed through a reviewer or the artificial intelligence learning model 330 among subtitle contents stored in the temporary storage 340.

Meanwhile, as shown in FIG. 4, the aforementioned artificial intelligence learning model 330 may include a data learner 331, a data acquirer 332, a language recognizer 333, and a translation reviewer 334.

The data learner 331 may learn the worker profile information and worker information stored in the member information storage 310 of the storage 120, and classify a translatable field category for each worker based on the learned worker information.

For example, in a case where a first worker has been performed mainly medical-related English translation, the data learner 331 may classify the main translation field of the first worker as a medical field based on profile information and worker information on the first worker.

The data acquirer 332 may acquire a worker list of workers capable of translating the content image requested by the client, based on the image information and the worker information learned through the data learner 331.

Specifically, when the translation request information including at least one of worker request information, task condition information, and image information is received, the controller 130 may input the image information to the artificial intelligence learning model 330. As described above, the image information may include at least one of address information, title information, and description information on the content image.

When such image information is input, the data acquirer 332 may classify a category of the content image requested by the client based on the image information input to the artificial intelligence learning model 330 and the worker information learned through the data learner 331, and may acquire a worker list of workers corresponding to the classified category.

Then, the controller 130 may transmit the worker list acquired through the data acquirer 332 to the first user terminal device 200-1 of the client, and when a command to select at least one worker from the worker list is received from the first user terminal device 200-1, the controller may transmit a task assignment message to a second user terminal device 200-2 of a worker corresponding to the selection command through the communication unit 110.

When the task assignment message is received in the second user terminal device 200-2, the worker may access the server 100 through the second user terminal device 200-2 and perform a translation task for the content image requested by the client.

The language recognizer 333 may recognize a first language related to audio data extracted from an image frame of an input content image.

Specifically, when the translation request information including at least one of an automatic translation command, task condition information, and image information is received from the first user terminal device 200-1, the controller 130 may acquire a content image based on the address information included in the image information, extract audio data from image data on the acquired content image, and input the extracted audio data to the artificial intelligence learning model. Accordingly, the language recognizer 333 may recognize the first language from the input data. The first language recognized through the language recognizer 333 may be input to the data acquirer 332, and the data acquirer 332 may acquire a second language converted from the first language, based on the input first language and language information previously learned by the data learner 331.

The translation reviewer 334 may convert the second language acquired through the data acquirer 332 or a language corresponding to a subtitle content updated in the storage 120 into a language appropriate to context based on previously learned subtitle contents.

Meanwhile, when at least one of an error correction review result from the translation reviewer 334 regarding the subtitle content updated in the storage 120, task period information on the subtitle content, evaluation information by a user who has used the subtitle content is input, the data acquirer 332 may acquire a task level value of a worker, who has worked on the subtitle content, by using the input information.

Meanwhile, at least some of components constituting the aforementioned artificial intelligence learning model 330 may be implemented as a software module or may be manufactured in the form of at least one hardware chip and mounted on the server 100. For example, at least one of the data learner 331 and the data acquirer 332 may be manufactured in the form of a dedicated hardware chip for artificial intelligence (AI), an existing general-purpose processor (e.g., a CPU or an application processor), or a part of a graphics-only processor (e.g., GPU) and may be mounted on the server 100. In this case, the dedicated hardware chip for artificial intelligence is a dedicated processor specialized in probability calculation, and has higher parallel processing performance than that of an existing general-purpose processor, so that it can quickly process a computational task in an artificial intelligence field, such as machine learning.

When some of the components constituting the artificial intelligence learning model 330 are implemented as a software module (or a program module including instructions), the software module may be stored in a non-transitory computer readable media that is readable by a computer. In this case, the software module may be provided by an operating system (OS) or may be provided by a predetermined application. Alternatively, some of the software module may be provided by an operating system (OS), and the others may be provided by a predetermined application.

Figure 5:
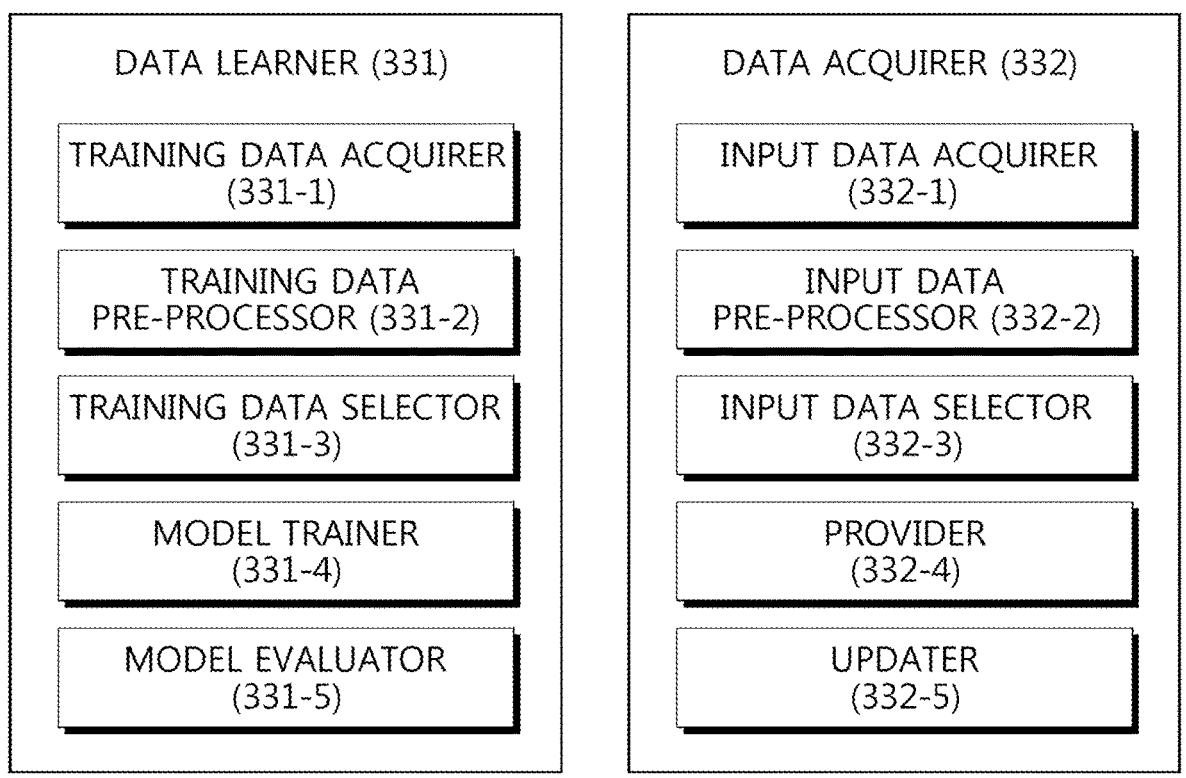
FIG. 5 is a detailed block diagram of a data learner and a data acquirer according to an embodiment of the present disclosure.

FIG. 5 is a detailed block diagram of a data learner and a data acquirer according to an embodiment of the present disclosure.

As shown in FIG. 5A, the data learner 331 may include a training data acquirer 331-1 and a model trainer 331-4. In addition, the data learner 331 may further selectively include at least one of a training data pre-processor 331-2, a training data selector 331-3, and a model evaluator 331-5.

The training data acquirer 331-1 may acquire training data necessary for a first model and a second model. According to an embodiment, the training data acquirer 331-1 may acquire, as the training data, profile information of members including clients, workers and reviewers registered in the server 100, worker information, a subtitle content on which a translation task has been completed by a worker, country-specific language information, and the like.

The model trainer 331-4 may use the training data to have criteria for how to classify a translatable field categories for each worker, how to convert a first language into a second language, how to evaluate task performance, and the like. For example, the model trainer 331-4 may train an artificial intelligence learning model through supervised learning that uses at least a portion of the training data as criteria for determination. Or, the model trainer 331-4 may train an artificial intelligence model, for example, through unsupervised learning that discovers criteria for determination of a situation by learning using training data without any guidance by itself.

Or, the model trainer 331-4 may train an artificial intelligence learning model, for example, through reinforcement learning that uses a feedback on whether a result of determination of a situation according to learning is correct. In addition, the model trainer 331-4 may train an artificial intelligence learning model, for example, by using a learning algorithm that includes error back-propagation or gradient descent.

In a case where there are a plurality of pre-constructed artificial intelligence models, the model trainer 331-4 may determine an artificial intelligence learning model having a high correlation between input training data and basic training data as the artificial intelligence learning model to train. In this case, the basic training data may be pre-classified by each type of data, and the artificial intelligence model may be pre-constructed by each type of data.

For example, the basic training data may be previously classified by various criteria such as a region where the training data was generated, a time when the training data was generated, a size of the training data, a genre of the training data, a creator of the training data, a type of an object in the training data, and the like.

When the artificial intelligence learning model is trained, the model trainer 331-4 may store the trained artificial intelligence learning model. In this case, the model trainer 331-4 may store the trained artificial intelligence learning model in the storage 120. Alternatively, the model trainer 331-4 may store the trained artificial intelligence learning model in a memory of an artificial intelligence server (not shown) connected to the server 100 over a wired or wireless network. The data learner 331 may further include the training data pre-processor 331-2 and the training data selector 331-3 to improve a recognition result of an artificial intelligence learning model or to save resources or time required for generating an artificial intelligence learning model.

The training data pre-processor 331-2 may pre-process acquired data so that the acquired data can be used for training for worker recommendation, automatic translation, and evaluation of a worker's task performance. The training data pre-processor 331-2 may process the data into a preset format, so that the model trainer 331-4 can use the acquired data.

The training data selector 331-3 may select data necessary for training from the data acquired by the training data acquirer 331-1 or data pre-processed by the training data pre-processor 331-2. The selected training data may be provided to the model trainer 331-4.

By a preset selection criterion, the training data selector 331-3 may select training data necessary for training from among acquired or pre-processed data. In addition, the training data selector 331-3 may select training data according to a selection criterion that is predetermined by training by the model trainer 331-4.

Meanwhile, the learning unit 331 may further include the model evaluator 331-5 in order to improve a recognition result of an artificial intelligence learning model. The model evaluator 331-5 may input evaluation data to the artificial intelligence learning model, and when a recognition result output from the evaluation data does not satisfy a predetermined criterion, the model evaluator 331-5 may cause the model trainer 331-4 to perform training again. In this case, the evaluation data may be predefined data for evaluating the artificial intelligence model.

For example, in a case where the number or ratio of evaluation data with an inaccurate recognition result among recognition results of the artificial intelligence learning model that has been trained for the evaluation data does not exceed a preset threshold, the model evaluator 331-5 may determine that the predetermined criterion is not satisfied. Meanwhile, when there are a plurality of trained artificial intelligence learning models, the model evaluator 331-5 may evaluate whether or not each trained artificial intelligence learning model satisfies the predetermined criterion, and may determine a model satisfying the predetermined criterion as a final artificial intelligence learning model. In this case, when there are a plurality of learning models that satisfy the predetermined criterion, the model evaluator 331-5 may determine any one or a predetermined number of learning models preset in the order of the highest evaluation score as a final artificial intelligence learning model.

Meanwhile, the data acquirer 332 may include an input data acquirer 332-1 and a provider 332-4 as shown in FIG. 5B. In addition, the data acquirer 332 may further selectively include at least one of an input data pre-processor 332-2, an input data selector 332-3, and a model updater 332-5.

The input data acquirer 332-1 may acquire data necessary to acquire information on worker recommendation, automatic translation, and evaluation of a worker's task performance.

The provider 332-4 may apply input data acquired from the input data acquirer 332-1 to the trained artificial intelligence learning model as an input value to acquire various types of information on worker recommendation, automatic translation, and evaluation of a worker's task performance.

The provider 332-4 may acquire a recognition result by applying data, which is selected by the input data pre-processor 332-2 or the input data selector 332-3 to be described later, to the artificial intelligence learning model as an input value. The recognition result may be determined by the artificial intelligence learning model.

In one embodiment, the provider 332-4 may apply a worker's profile information and worker information acquired by the input data acquirer 332-1 to the trained first model to acquire (or estimate) a translatable field category of the worker.

The data acquirer 332 may further include the input data pre-processor 332-2 and an input data selector 332-3 to improve a recognition result of the artificial intelligence learning model or to save resources or time for providing the recognition result.

The input data pre-processor 332-2 may pre-process acquired data so that the acquired data to be input to the first and second models can be used. The input data pre-processor 332-2 may process acquired data into a preset format, so that the provider 332-4 can acquire information on worker recommendation, automatic translation, and evaluation of a worker's task performance and use the acquired data.

The input data selector 332-3 may select data necessary for determining a situation from among data acquired by the input data acquirer 332-1 or data pre-processed by the input data pre-processor 332-2. The selected data may be provided to the provider 332-4. The input data selector 332-3 may select some or all of the acquired or pre-processed data by a preset selection criterion for determining a situation. In addition, the input data selector 332-3 may select data by a predetermined selection criterion by training by the model trainer 331-4.

The model updater 332-5 may control the artificial intelligence learning model to be updated based on evaluation of a recognition result provided by the provider 332-4.

For example, by providing the recognition result provided from the provider 332-4 to the model trainer 331-4, the model updater 332-5 may request additional training or update of the artificial intelligence learning model from the model trainer 331-4.

Figure 6:
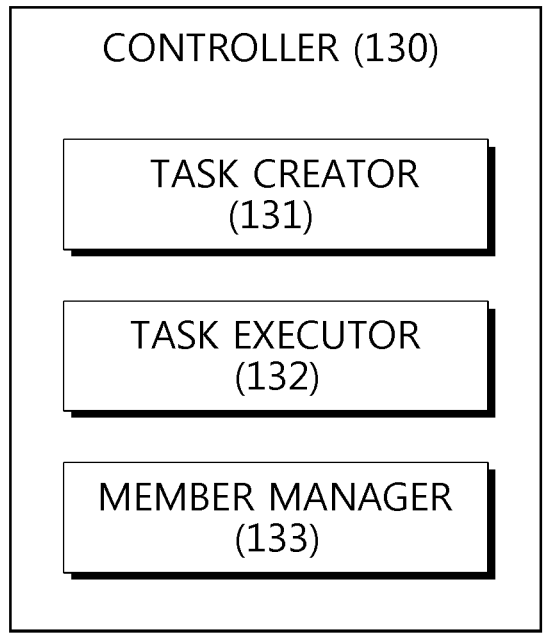
FIG. 6 is a detailed block diagram of a controller according to an embodiment of the present disclosure.

Meanwhile, the aforementioned controller 130 may include the configuration as shown in FIG. 6.

FIG. 6 is a detailed block diagram of a controller according to an embodiment of the present disclosure.

As shown in FIG. 6, the controller 130 may include a task creator 131, a task executor 132, and a member manager 133.

When translation request information including at least one of task condition information and image information is received from the first user terminal device 200-1, the task creator 131 may determine as to validity of a content image is valid based on the image information, generate task information related to the translation request information of which validity has been verified, and store the task information in the storage 120. As described above, the image information may include at least one of address information, title information, and description information on a content image.

Specifically, when translation request information for the content image requested by the client is received from the first user terminal device 200-1, the task creator 131 may determine as to validity of the corresponding content image based on the address information included in the translation request information. As a result of the determination, if the validity of the content image is verified, the task creator 131 may generate task information on the received translation request information and store the task information in the storage 120, and if the validity of the corresponding content image is not verified, the task creator 131 may transmit a task disabled message to the first user terminal device 200-1 through the communication unit 110.

Meanwhile, if the received translation request information includes a video file for the content image requested by the client, the task creator 131 does not determine as to validity of the received translation request information, but may generate task information on the corresponding translation request information and store the task information in the storage 120.

The task executor 132 may provide a second user terminal device 200-2 of a translator with a subtitle content creating tool for a translation task of a content image related to at least one item of translation request information stored in the storage 120, and when the subtitle content on which the translation task has been completed is received from the second user terminal device 200-2, the task executor 132 may store the received subtitle content in the storage 120.

As described in FIG. 3, the storage 120 may store in the temporary storage 340 a subtitle content on which a translation task has been completed, and may store in the final storage 350 a subtitle content of which translation review has been completed among subtitle contents stored in the temporary storage 340. Accordingly, the task executor 132 may provide a third user terminal device (not shown) of a reviewer with a review tool for translation review for a language included in at least one subtitle content stored in the temporary storage 340, and when a review completion message is received from the third user terminal device (not shown), the task executor 132 may store a review-completed subtitle content in the final storage 350.

When a registration request command is received from a second user terminal device 200-2 of an unregistered worker, the member manager 133 may evaluate test performance of the unregistered worker and generate task grade information on the unregistered worker. Then, the member manager 133 may generate profile information including at least one of personal information, history information, cost information, and evaluation information provided from the unregistered worker in addition to task grade information, and store the profile information in the member information storage 310 of the storage 120.

According to a further aspect of the present disclosure, the member manager 133 may update a pre-registered worker's task grade information using at least one of the following: task period information for a subtitle content on which a task has been completed by the pre-registered worker; error correction information for the subtitle content; and evaluation information by a user who has used the subtitle content.

For example, when a task on a subtitle content for a content image requested by a client is completed, the member manager 133 may perform task performance evaluation on a corresponding worker by referring to the client's requested translation completion date based on translation request information of the client who has requested the corresponding subtitle content, and the worker's period of performing the task on the subtitle content, and may update task grade information of the corresponding worker based on the performance evaluation information on the performed task.

In another example, the member manager 133 may update based on the above-described task performance evaluation information and review evaluation information by a reviewer who has reviewed the subtitle content on which the task is completed by the worker.

In yet another example, the member manager 133 may update task grade information of the worker who has performed the task on the subtitle content, based on the above-described task performance evaluation information, the review evaluation information, and use evaluation information by a user who has used the corresponding subtitle content.

So far, the configuration of the server 100 providing the subtitle service according to the present disclosure and an operation of each configuration have been described in detail. Hereinafter, a user terminal device 200 according to the present disclosure will be described in detail. Here, the user terminal device 200 may be the first user terminal device 200-1 of a client or the second user terminal device 200-2 of a worker.

Figure 7:
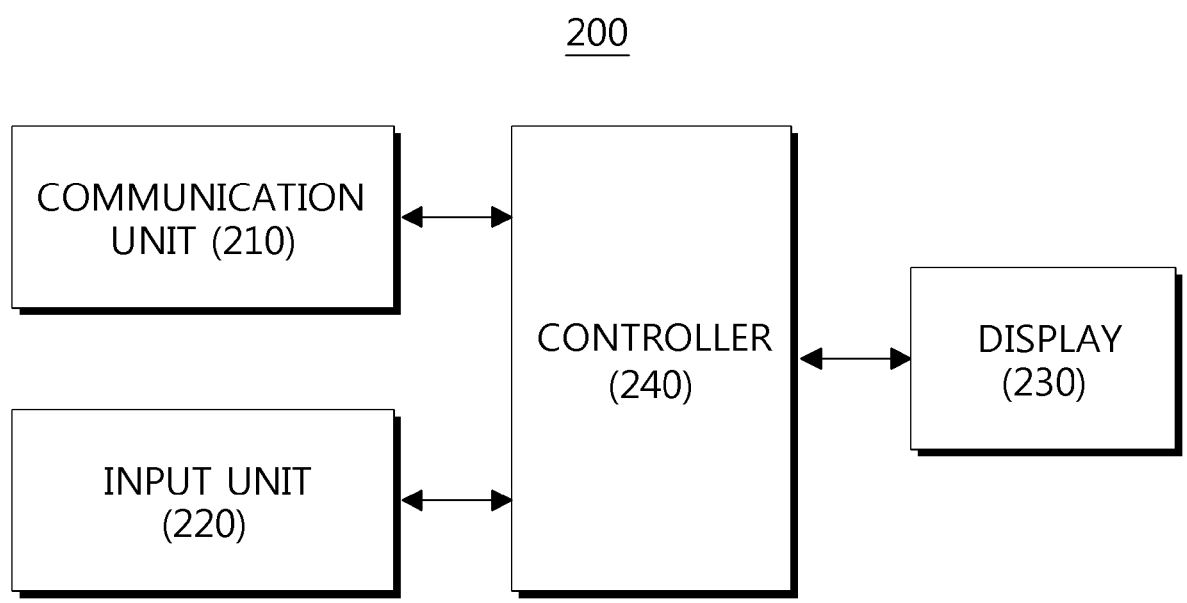
FIG. 7 is a block diagram of a user terminal device according to an embodiment of the present disclosure.

FIG. 7 is a block diagram of a user terminal device according to an embodiment of the present disclosure.

The user terminal device 200 may be an electronic device such as a desktop, a laptop, a smart phone, and a tablet. As shown in FIG. 7, the user terminal device 200 may include a communication unit 210, an input unit 220, a display 230, and a controller 240.

The communication unit 210 may perform data communication with the server 100, which provides the subtitle service, to transmit and receive project information on a content image requested by a client, information on a subtitle content on which a translation task has been completed by a worker, information on the subtitle content on which translation review has been completed by a reviewer, and the like.

According to an embodiment, the communication unit 210 may include a connector that includes at least one of the following: a wireless communication module such as a short-range communication module and a wireless LAN module; and a wired communication module such as a High-Definition Multimedia Interface (HDMI), a Universal Serial Bus (USB), and an Institute of Electrical and Electronics Engineers (IEEE) 1394.

The input unit 220 may be an input means for receiving various user commands and transmitting the user commands to the controller 240 to be described later. In particular, the input unit 220 may receive a user command for accessing the server 100 providing a subtitle service, a translation request command for requesting a translation task for a client's content image, a task assignment command for assigning the requested translation task to a worker, and the like. The input unit 220 may include: a microphone (not shown) for receiving a user's voice command; an operation unit (not shown) implemented as a keypad provided with various function keys, number keys, special keys, character keys, etc.; and a touch input unit (not shown) for receiving a user's touch command through the display 230 to be described later.

The display 230 may display various content images, an execution icon corresponding to each pre-registered application, an execution screen of an application corresponding to a selected icon, and the like. In particular, when the user terminal device 200 accesses the server 100 that provides a subtitle service, the display 230 may display a subtitle service window provided by the server 100.

The display 230 may be implemented as a liquid crystal display (LCD), an organic light emitting diode (OLED), or the like. In particular, the display 230 may be implemented in the form of a touch screen formed in a mutually layered structure together with a touch input unit (not shown) that receives a user's touch command as described above.

The controller 240 may control the overall operation of each element forming the user terminal device 200. In particular, the controller 240 may control the display 230 to display the subtitle service window according to a user command input through the input unit 220. Accordingly, the display 230 may display the subtitle service window provided to the server 100 according to a control command of the controller 240.

Accordingly, through the subtitle service window displayed on the user terminal device 200, the user may request a translation task for a content image or perform the translation task for the requested content image. In addition, through the subtitle service window displayed on the user terminal device 200, the user may perform a review task on a translated subtitle content or perform an ability evaluation test of an unregistered worker.

Hereinafter, an operation of displaying a subtitle service window in the aforementioned user terminal device 100 will be described in more detail.

Figure 8:
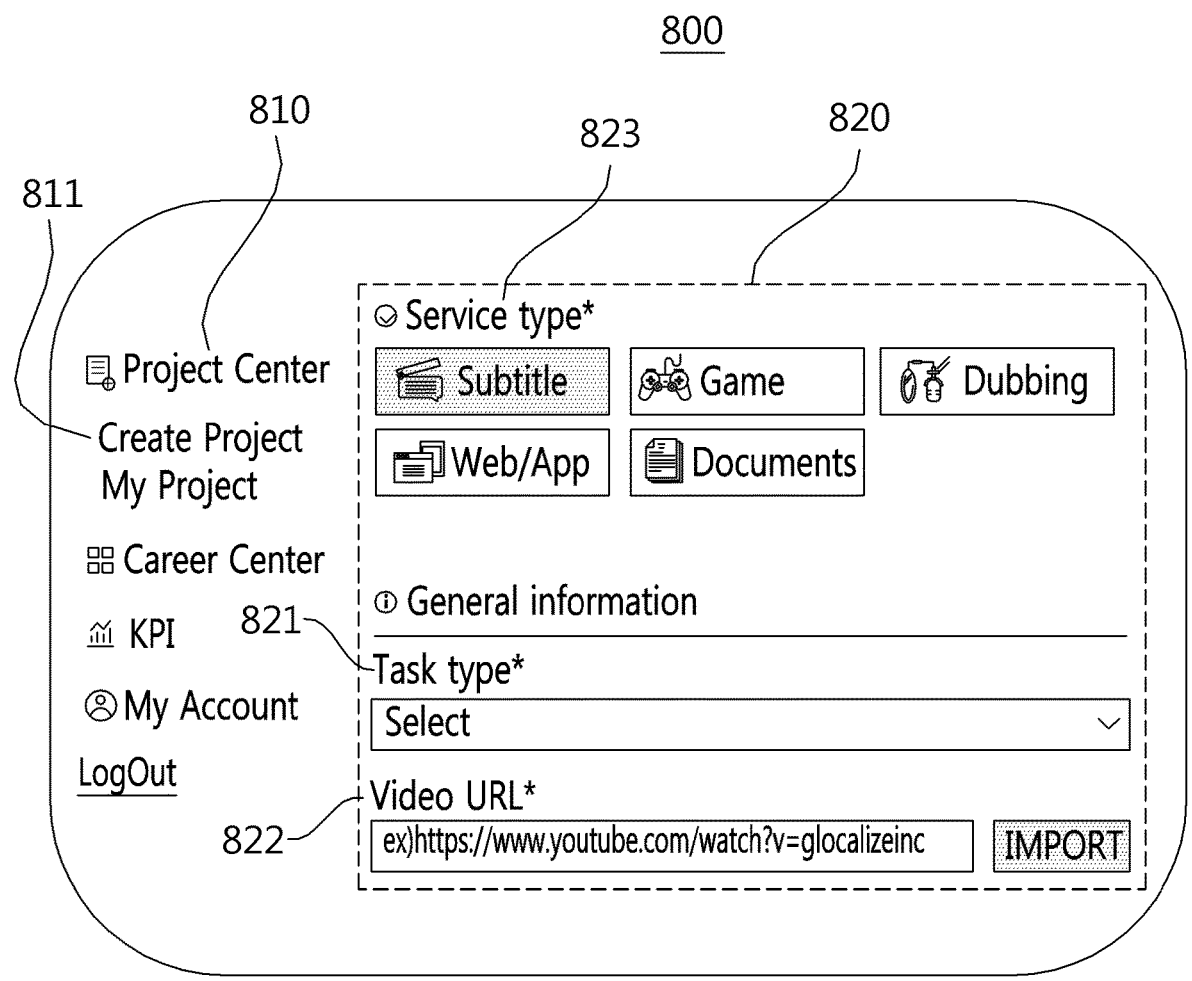
FIGS. 8 and 9 are exemplary diagrams of displaying a subtitle service window for a client in a user terminal device according to an embodiment of the present disclosure.
Figure 9:
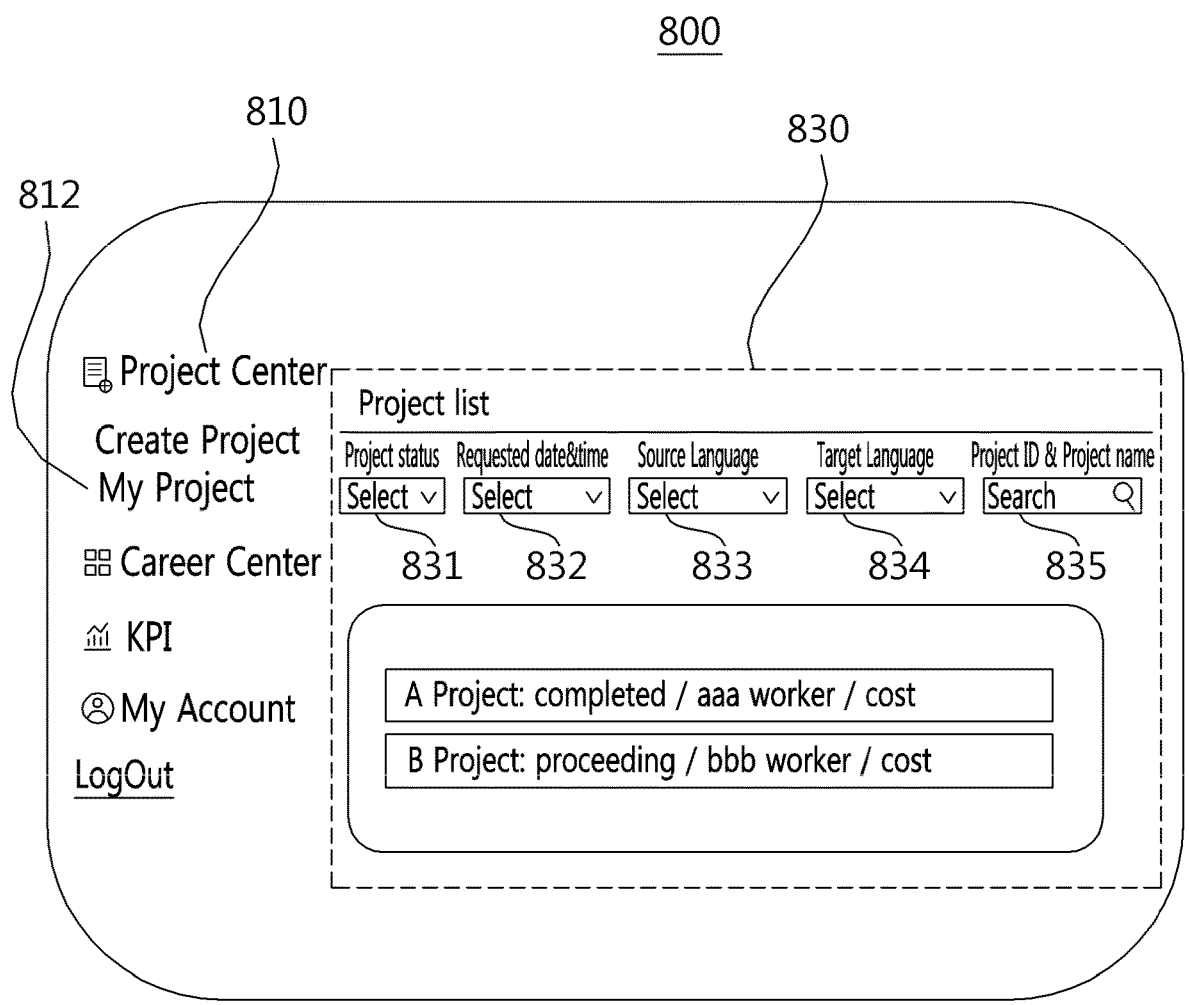

FIGS. 8 and 9 are exemplary diagrams of displaying a subtitle service window for a client in a user terminal device according to an embodiment of the present disclosure.

As shown in FIG. 5, a client's first user terminal device 200-1 connected to the server 100 providing a subtitle service may display a subtitle service window 800 provided by the server 100. A project creating UI (Project Center) 810 for a client may be displayed in one area of the subtitle service window 800. When a command to select a project creation icon 511 from among icons included in the project creating UI 810 is input, the first user terminal device 200-1 may display a first client window 820 for inputting translation request information for a content image requested by the client. As described above, the first client window 820 may include at least one of: a first UI 821 for setting at least one of a language task for a source language included in the content image and a translation task for translation into a language requested by the client; and a second UI 822 for inputting address information on the content image. Accordingly, the client may set a type of a subtitle to be inserted into the content image through the first UI 821, and may input the address information on the content image through the second UI 822.

Meanwhile, the first client window 820 may further include a third UI 823 for setting a category (movie subtitle, game, document, etc.) for the content image requested by the client. Accordingly, the client may set a category for a content image to be requested, through the third UI 823 of the first client window 820.

When the setting by the client is completed, the first user terminal device 200-1 may transmits the translation request information set by the client to the server 100, and the server 100 may generate task information on the task request information received from the first user terminal device 200-1 and store the task information in the task information storage 320 of the storage 120.

Meanwhile, as shown in FIG. 9, when a command to select My Project icon 812 among icons included in the project creating UI 810 is input, the first user terminal device 200-1 may display a second client window 830 for searching for the client's project. As shown, the second client window 830 may include at least one of: a first UI 831 for setting a progress status of a project for which translation is requested by the client; a second UI 832 for searching for a project task execution period; a third UI 833 for selecting a source language of a content image; a fourth UI 834 for selecting a language for translation; and a fifth UI 835 for searching for a specific project. In addition, the second client window 830 may further include a sixth UI 836 for displaying a search result corresponding to a user command of a client with respect to at least one of the first to fifth UIs 831 to 835.

For example, through the first UI 531, the client may request a search for a project in which a translation task on a subtitle content has been completed among the projects requested by the client. When such a user command of the client is input, the first user terminal device 200-1 may receive a list of search results for the project in which the translation task has been completed from the server 100 and display the list on the sixth UI 836.

As shown, when a translation task for project A is completed, the first user terminal device 200-1 may display, on the sixth UI 836, a list of search results for project A based on information received from the server 100.

Meanwhile, the client may request, through the first UI 531, a search for a project in which a task for a subtitle content is being performed among projects requested by the client. As illustrated, when a translation task for project B is being performed, the first user terminal device 200-1 may display, on the sixth UI 836, a list of search results for project B based on information received from the server 100.

Figure 10:
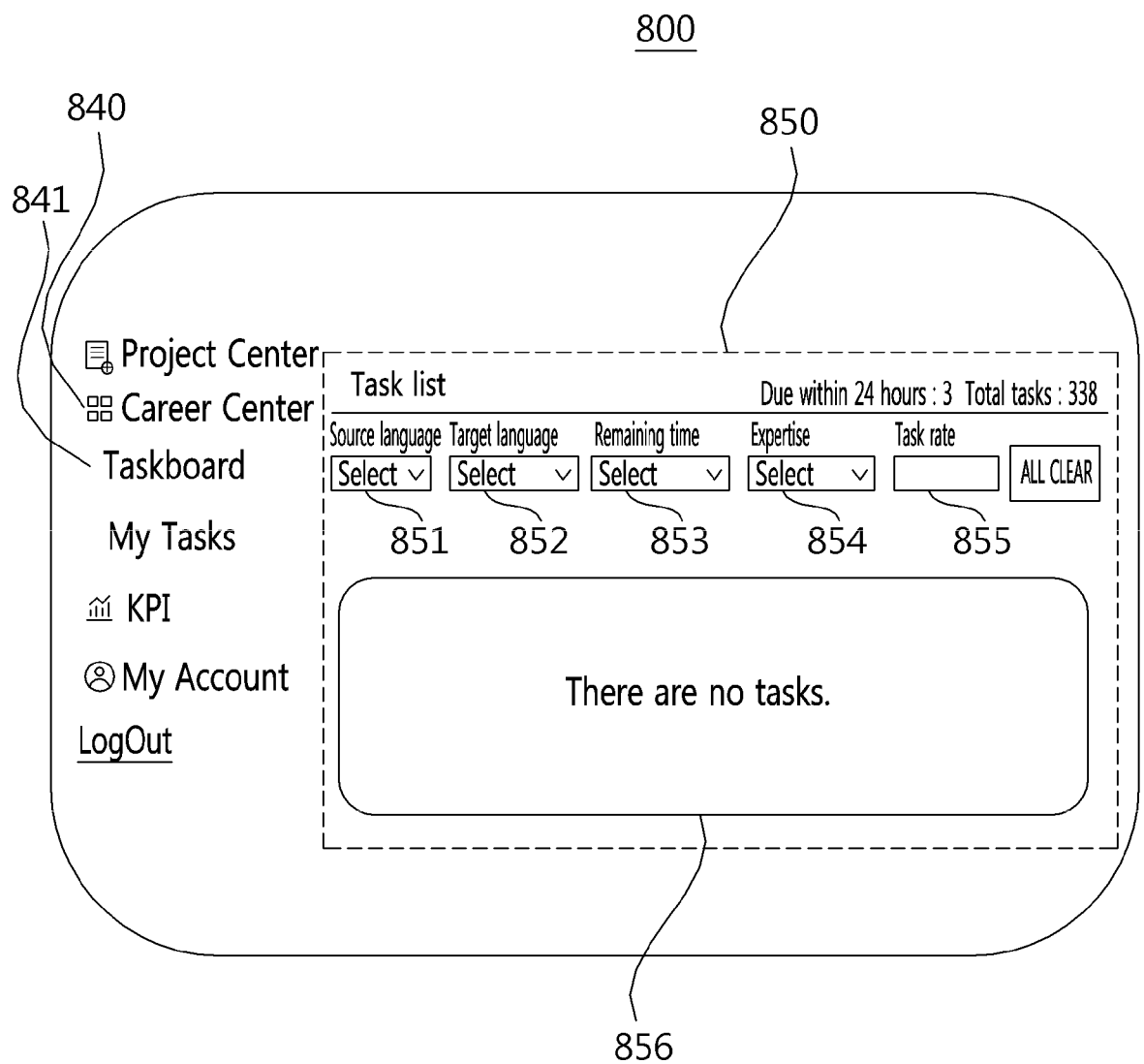
FIGS. 10 to 12 are exemplary views of displaying a subtitle service window for a worker in a user terminal device according to an embodiment of the present disclosure.
Figure 11:
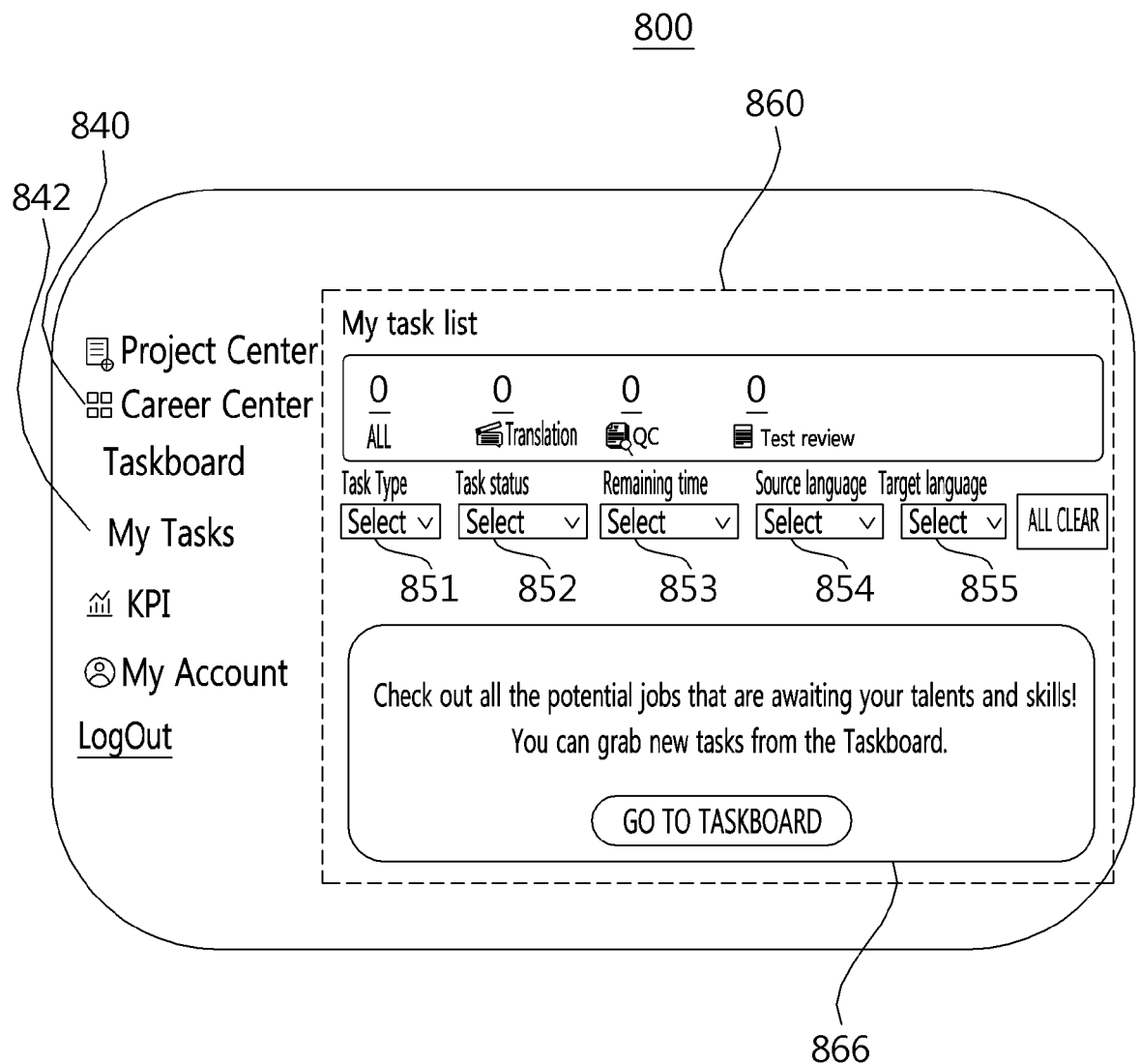
Figure 12:
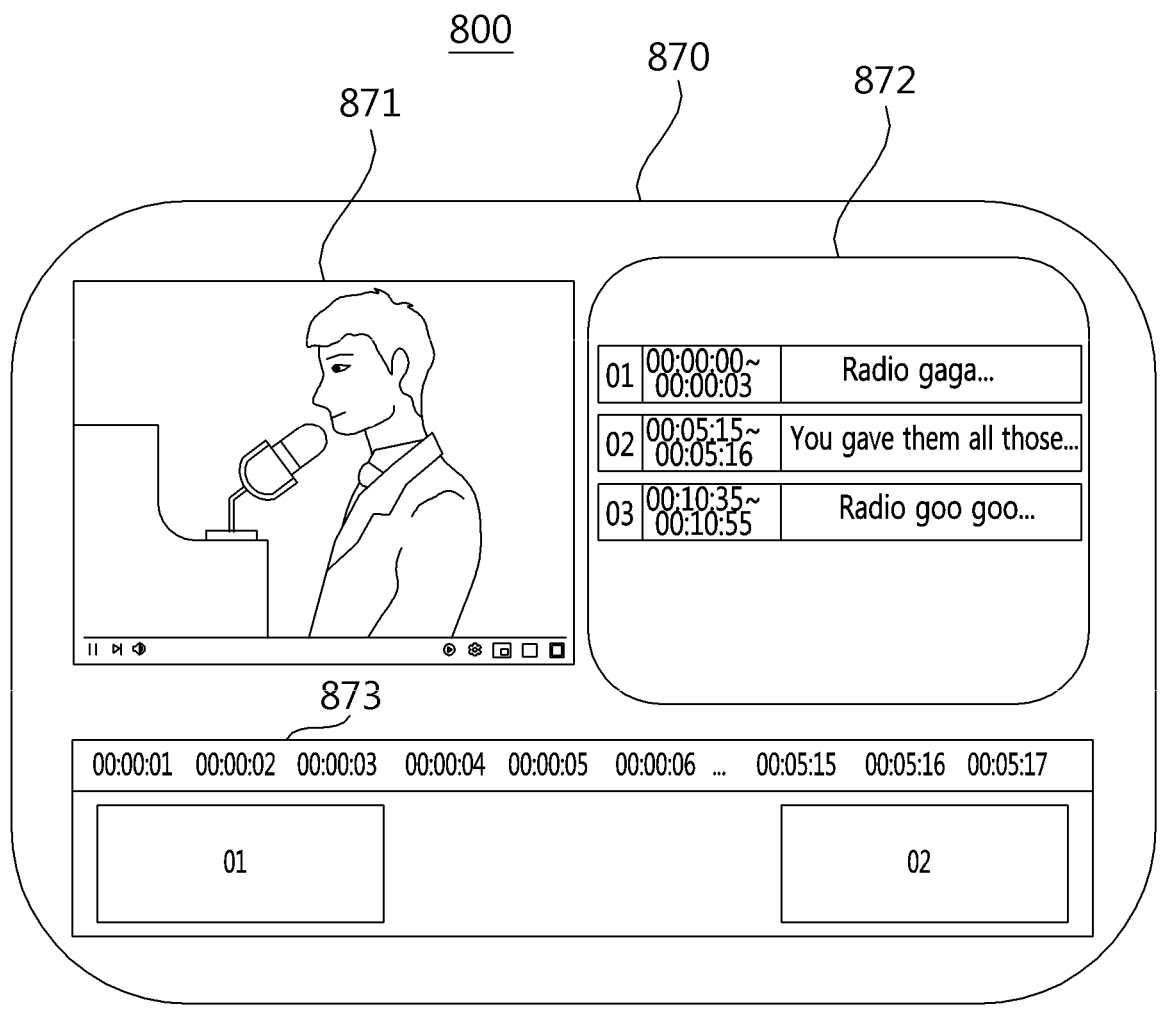

FIGS. 10 to 12 are exemplary diagrams of displaying a subtitle service window for a worker in a user terminal device according to an embodiment of the present disclosure.

As shown in FIG. 10, a second user terminal device 200-2 of a worker may display the subtitle service window 800 provided by the server 100. As illustrated, a project task UI (Career Center) 840 for a worker may be displayed in one area of the subtitle service window 800, and when a command to select a project search icon (Taskboard) 841 for searching for a task to work on from among icons included in the project task UI 840 is input, the second user terminal device 200-2 may display the first worker window 850 for searching for a task available for translation. As illustrated, the first worker window 850 may include at least one of: a first UI 851 for selecting a source language included in the content image; a second UI 852 for selecting a target language requested for translation by the client; a third UI 853 for selecting a task execution period; a fourth UI 854 for selecting a category for the content image; and a fifth UI 855 for setting task difficulty. In addition, the first worker window 850 may further include a sixth UI 856 for displaying a search result corresponding to a user command of a worker with respect to at least one of the first to fifth UIs 851 to 855.

For example, the worker may select the source language of the content image as a first language (Korean) through the first UI 851, select a second language (English) as a target language requested for translation through the second UI 852, and select one month as the operation period through the third UI 853. When the worker's user command is input, the second user terminal device 200-2 may receive a search result list for at least one task information corresponding to the worker's user command from the server 100 and display the search result list on the sixth UI 856.

Meanwhile, as shown in FIG. 11, when a command to select a project search icon 842 is received from the worker, the second user terminal device 200-2 may display the second worker window 860 to search for a project assigned to the worker.

As described above, the second worker window 860 may include at least one of: a first UI 861 for selecting a task type; a second UI 862 for retrieving a task progress status; a third UI 863 for selecting a remaining task period; a fourth UI 864 for selecting a source language included in the content image; and a fifth UI 865 for selecting a target language for translation. In addition, the second worker window 860 may further include a sixth UI 866 that displays a search result corresponding to a user command of the worker with respect to at least one of the first to fifth UIs 861 to 865.

For example, the worker may select a translation-related task type through the first UI 861, select a progress status of a task through the second UI 862, and select a second language (English) as a target language through the fifth UI 862. When the user command of the worker is input, the second user terminal device 200-2 may receive a search result list for a project in which a translation-related task is being performed into the second language from the server 100, and may display the search result list on the sixth UI 866. When one of the projects included in the search result list is selected in a state in which the search result list corresponding to the worker's request is displayed on the sixth UI 866, the second user terminal device 200-2 may display a subtitle content creating tool window 870 for performing a task for the selected project, as shown in FIG. 12.

Specifically, when the worker's command to select a first project among the projects included in the search result list is input, the second user terminal device 200-2 may display a content image related to the selected first project in a first area 871 of the subtitle content creating tool window 870, may display, in the second area 872, a subtitle content creating tool UI for generating a subtitle content for each section of the corresponding content image, and may display, in a third area 873, a subtitle content editing tool UI for editing a playback period of the subtitle content for each section generated through the subtitle content work tool UI.

Accordingly, through the second area 872, the worker may perform a translation task to translate a source language of the content image displayed in each section of the first area 871 into a language requested by the client.

For example, the source language may be included in the first section (00:00:00 to 00:00:03 of the content image. In this case, the worker may perform a translation task to translate the source language of the first section into the language requested by the client through the second area 872. Through this example, first to third subtitle contents 01 to 03 for each section in relation to the content image translated by the worker may be displayed in the second area 872.

Meanwhile, when the first to third subtitle contents 01 to 03 for respective sections is generated in relation to the corresponding content image, the second user terminal device 200-2 may display, based on time information corresponding to each of the first to third subtitle contents, playback periods of the first to third subtitle contents 01 to 03 for the respective playback time of the corresponding content images in the form of a bar through the third area 873. Accordingly, the worker may edit the playback period of each of the first to third subtitle contents by adjusting a length of a bar corresponding to each of the first to third subtitle contents displayed in the third area 873.

So far, an operation performed by the first user terminal device 200-1 of the client according to the present disclosure to register project information on a content image requested by a client in the server 100 through a subtitle service window, and an operation performed by the second user terminal device 200-2 of a worker to perform a translation task for a project pre-registered in the server 100 through a subtitle service window have been described in detail. Hereinafter, a method for providing a subtitle service using an artificial intelligence learning model in the server 100 according to the present disclosure and a method for controlling the server 100 providing a subtitle service will be described in detail.

Figure 13:
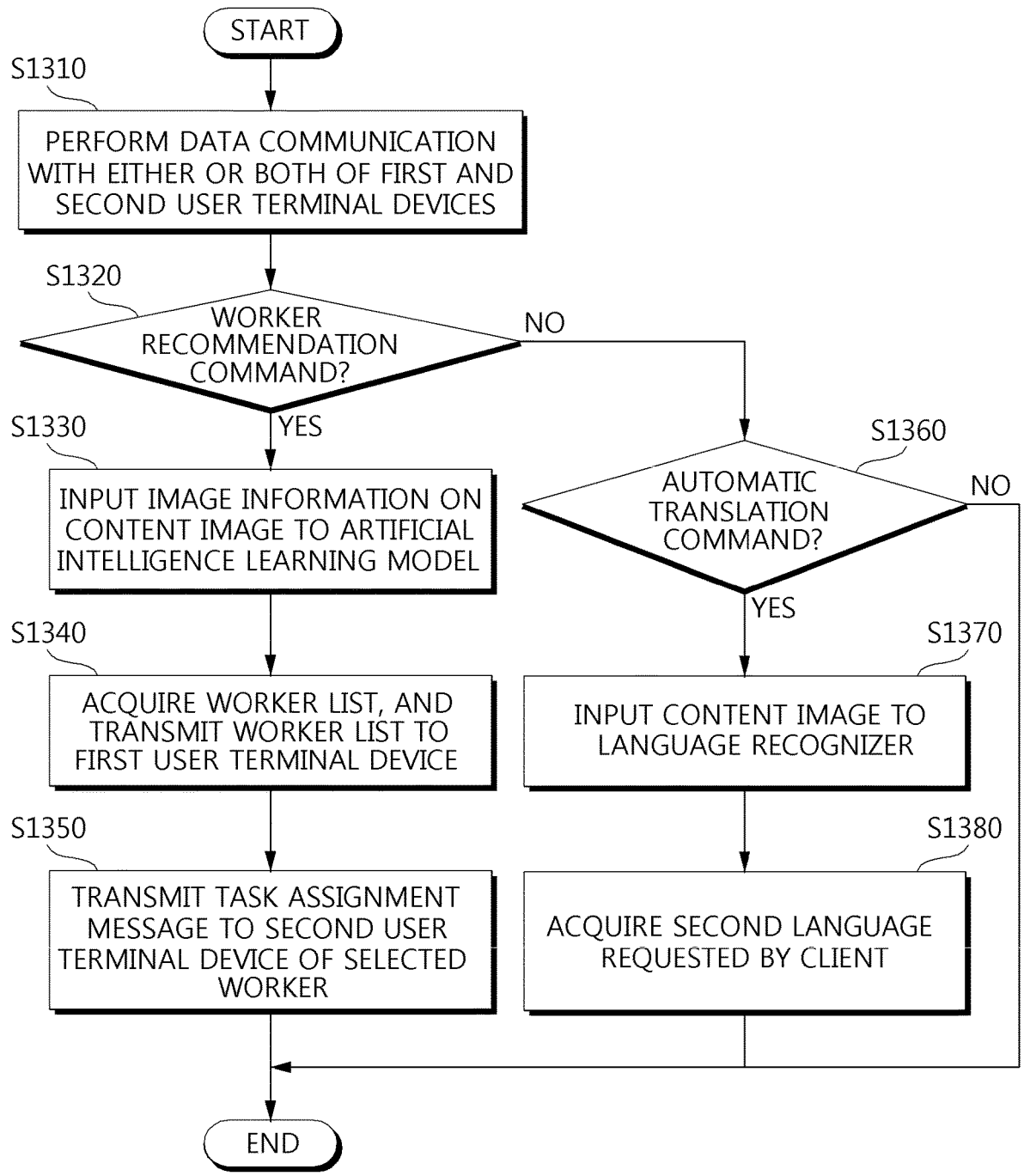
FIG. 13 is a flowchart of a method for providing a subtitle service using an artificial intelligence learning model in a server according to an embodiment of the present disclosure.

FIG. 13 is a flowchart of a method for providing a subtitle service using an artificial intelligence learning model in a server according to an embodiment of the present disclosure.

At first, the server 100 performs data communication with either or both of a first user terminal device 200-1 of a client requesting translation of a content image and a second user terminal device 200-2 of a worker who performs a translation task in operation S1310.

When a worker recommendation command of the client is received from the first user terminal device 200-1, the server 100 may input image information on a content image requested by the client to an artificial intelligence learning model in operations S1320 and S1330.

Specifically, when translation request information including at least one of worker request information, task condition information, and image information is received from the first user terminal device 200-1, the server 100 may input the image information included in the translation request information to the artificial intelligence learning model. Here, the image information may include at least one of address information, title information, and description information on a content image.

Then, the server 100 may acquire a worker list of workers capable of translating the corresponding content image through the artificial intelligence learning model, and transmit the acquired worker list to the first user terminal device 200-1 in operation S1340.

The above-described artificial intelligence learning model may learn worker information stored in a storage through a data learner, and classify a translatable field category for each worker based on the learned worker information. Therefore, when the image information on the content image requested by the client is input, the artificial intelligence learning model may input the worker information learned through a data learner and the input image information to a data acquirer of the artificial intelligence learning model to acquire a worker list of workers capable of translating the content image requested by the client. Here, the worker information may include at least one of profile information for each worker, task-completed subtitle content for each worker, and task grade information evaluated for each worker.

When such a worker list is acquired, the server 100 may transmit the acquired worker list to the first user terminal device 200-1. Accordingly, the client may select a worker to request a translation task from the worker list displayed on the first user terminal device 200-1. When a command to select a worker is input, the first user terminal device 200-1 may transmit the input command to the server 100.

When a command to select at least one worker included in the worker list is received from the first user terminal device 200-1, the server 100 may transmit a task assignment message to the second user terminal device 200-2 of the worker corresponding to the selection command. Accordingly, the worker may access the server 100 through the second user terminal device 200-2 to perform a translation task for the content image requested by the client.

Meanwhile, when the translation request information including at least one of an automatic translation command, task condition information, and image information is received from the first user terminal device 200-1 in operation S1320, the server may acquire the content image based on the address information included in the image information and input image data of the acquired content image to a language recognizer of the artificial intelligence learning model in operations S1360 and S1370.

Then, when a first language related to the audio data of the content image is recognized through the language recognizer, the server 100 may input the recognized first language to a data acquirer to acquire a second language requested by the client from the first language in operation S1380. When the second language is acquired, the server 100 may input the second language to a translation reviewer of the artificial intelligence learning model. Accordingly, the translation reviewer may analyze the input second language, convert the second language into a language appropriate to the context, and generate a subtitle content for the content image requested by the client. In addition, when a subtitle content is updated in a storage, the translation reviewer may convert a language corresponding to the updated subtitle content into a language appropriate to the context.

Meanwhile, when the subtitle content on which a translation task has been completed by a worker selected by the client is updated in the storage, the server 100 may input, to the data acquirer, at least one of: an error correction review result from the translation reviewer regarding the updated subtitle content; a task period information on the corresponding subtitle content; and evaluation information by a user who has used the subtitle content. Then, the server 100 may acquire, based on the input information,] a task level value of the worker who has worked on the subtitle content.

Figure 14:
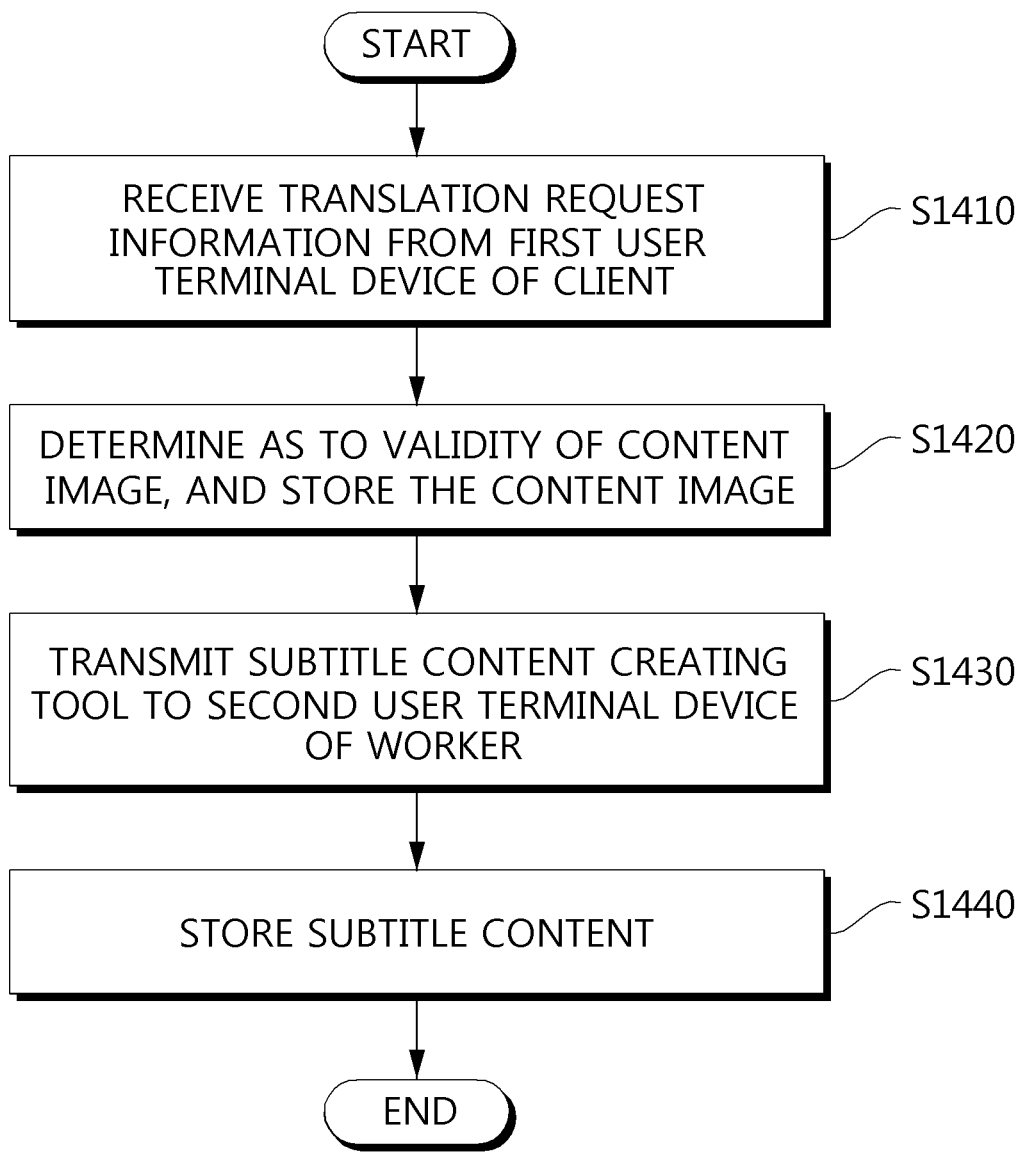
FIG. 14 is a flowchart of a method for controlling a server providing a subtitle service according to the present disclosure.

FIG. 14 is a flowchart of a method for controlling a server providing a subtitle service according to the present disclosure.

As shown in FIG. 14, a server 100 providing a subtitle service may receive translation request information including at least one of task condition information and image information from a first user terminal device 200-1 of a client in operation 1410. When the translation request information is received, the server 100 may determine as to validity of a content image requested by the client based on the image information included in the received translation request information, generate task information on the translation request information of which validity has been verified, and store the task information in operation S1420.

Here, the image information may include at least one of address information, title information, and description information on a content image.

Then, in response to a request from a worker, the server 100 transmits, to the worker's second user terminal device 200-2, a subtitle content creating tool for a translation task for the content image related to at least one item of translation request information stored in the storage in operation S1430. Accordingly, the worker may perform the translation task for the content image requested by the client by using a subtitle content generating tool displayed on the second user terminal device 200-2. Meanwhile, the second user terminal device 200-2 may transmit, to the server 100, the subtitle content on which the translation task has been completed. However, the present disclosure is not limited thereto, and the subtitle content on which the translation task has been performed by the worker may be stored in the server 100 in real time, and when the translation task has been completed, the second user terminal device 200-2 may transmit a translation completion message to the server 100.

When a subtitle content on which a translation task has been completed or a translation completion message is received from the second user terminal device 200-2, the server may store the subtitle content translated by the worker in operation S1440.

According to an embodiment, the server 100 may store, in the temporary storage, a subtitle content on which a translation task has been completed, and may store, in the final storage, a subtitle content on which translation review has been completed by a reviewer among subtitle contents stored in the temporary storage.

Specifically, when a review command is received from the user terminal device 200 of the reviewer, the server 100 may provide a list of subtitle contents stored in the temporary storage to the user terminal device 200 of the reviewer. Accordingly, the user terminal device 200 of the reviewer may display the list received from the server 100.

Meanwhile, when a command to select a first subtitle content from among the subtitle contents included in the list from the user terminal device 200 of the reviewer, the server 100 may transmit web information on the review tool for the first subtitle content to the user terminal device 200 of the reviewer. Accordingly, the reviewer may review the first subtitle content through the user terminal device 200 of the reviewer, and the user terminal device 200 of the reviewer may transmit a review completion message regarding the first subtitle content reviewed by the reviewer to the subtitle service server 100.

When the review completion message regarding the first subtitle content is received from the user terminal device 200 of the reviewer, the subtitle service server 100 may delete the first subtitle content stored in the temporary storage, and store the first subtitle content reviewed by the reviewer in the final storage.

Meanwhile, the server 100 may register profile information and worker information of an unregistered worker. Specifically, when a registration request command is received from a second user terminal device 200-2 of an unregistered worker, the server 100 may evaluate test performance of the unregistered worker and generates task grade information of the unregistered worker. Then, the server 100 may generate and register worker information including profile information and task grade information including at least one of personal information, history information, cost information, and evaluation information provided from unregistered workers.

Meanwhile, the server 100 may update the worker information on the registered worker. Specifically, the server 100 may update task grade information of a pre-registered worker by using at least one of: task period information, error correction information, and evaluation information by a user who has used a subtitle content on which a task has been completed by the registered worker.

Meanwhile, the method for controlling the server 100 according to the above-described various embodiments may be coded in software and stored in non-transitory readable media. Such non-transitory readable media can be installed and used in a variety of devices.

A non-transitory readable medium is not a medium for storing data for a short time such as a register, cache or memory, but refers to a medium that semi-permanently stores data and can be read by a device. Specifically, the non-transitory readable medium may include a CD, DVD, hard disk, Blu-ray disc, USB, memory card, or ROM.

Hereinabove, exemplary embodiments of the present invention have been described with reference to the accompanying drawings. Specific terms or words used herein should be construed in accordance with the spirit of the present invention. It should be understood that many variations and modifications of the basic inventive concept described herein will still fall within the spirit and scope of the present invention as defined in the appended claims and their equivalents.

What is claimed is:

1. A server providing a subtitle service, the server comprising:
   a communication processor configured to perform data communication with either or both of a first user terminal device of a client requesting translation of a content image and a second user terminal device of a worker performing a translation task;
   a storage configured to store a worker search list based on learned worker information, and an artificial intelligence learning model for performing a worker's task performance evaluation; and
   a controller configured to input image information on the content image to the artificial intelligence learning model in accordance with a worker recommendation command of the client to acquire a worker list of workers capable of translating the content image, and control the communication processor to transmit the acquired worker list
   to the first user terminal device,
   wherein the worker information comprises at least one of: profile information on each worker, a subtitle content task-completed by each worker, and task grade information evaluated for each worker,
   wherein the controller comprises:
   a task creator configured to, in response to receiving translation request information comprising at least one of task condition information and image information from the first user terminal device, determine as to validity of the content image based on the image information, generate task information related to the translation request information of which validity is verified, and store the task information; and
   a task executor configured to provide a subtitle content creating tool for a translation task for a content image related to at least one item of translation request information stored in the storage to the second user terminal device, and, in response to receiving a subtitle content on which the translation task has been completed from the second user terminal device, store the subtitle content in the storage, and
   wherein the image information comprises at least one of address information, title information, and description information on the content image.

2. The server of claim 1, wherein the artificial intelligence learning model comprises:
   a data learner configured to learn worker information stored in the storage, and classify a translatable field category for each worker based on the learned worker information; and
   a data acquirer configured to acquire a worker list of workers capable of translating the content image based on the image information and the worker information learned through the data learner.

3. The server of claim 2, wherein the controller is further configured to:
   in response to receiving translation request information comprising at least one of worker request information, task condition information, and image information, input the image information to the artificial intelligence learning model and transmit the worker list acquired through the data acquirer to the first user terminal device; and
   in response to receiving a command to select at least one worker included in the worker list from the first user terminal device, control the communication unit to transmit a task assignment message to a second user terminal device of a worker corresponding to the selection command,
   wherein the image information comprises at least one of address information, title information, and description information on the content image.

4. The server of claim 1, wherein the storage comprises:
   a temporary storage configured to store the subtitle content on which the translation task has been completed; and
   a final storage configured to store a subtitle content on which translation review has been completed among subtitle contents stored in the temporary storage,
   wherein the task executor is further configured to provide a third user terminal device of a reviewer with a review tool for translation review for a language included in at least one subtitle content stored in the temporary storage, and, in response to receiving a review completion message from the third user terminal device, store in the final storage the subtitle content on which translation review has been completed.

5. The server of claim 1, wherein the controller further comprises a member manager configured to, in response to receiving a registration request command from a second user terminal device of an unregistered worker, generate task grade information of the unregistered worker by evaluating test performance of the unregistered worker, generate profile information comprising personal information, history information, cost information, and evaluation information provided from the unregistered worker, and store the profile information in the storage.

6. A server providing a subtitle service, the server comprising:
   a communication processor configured to perform data communication with either or both of a first user terminal device of a client requesting translation of a content image and a second user terminal device of a worker performing a translation task;
   a storage configured to store a worker search list based on learned worker information, and an artificial intelligence learning model for performing a worker's task performance evaluation; and
   a controller configured to input image information on the content image to the artificial intelligence learning model in accordance with a worker recommendation command of the client to acquire a worker list of workers capable of translating the content image, and control the communication processor to transmit the acquired worker list to the first user terminal device,
   wherein the worker information comprises at least one of: profile information on each worker, a subtitle content task-completed by each worker, and task grade information evaluated for each worker,
   wherein the artificial intelligence learning model comprises:
   a data learner configured to learn worker information stored in the storage, and classify a translatable field category for each worker based on the learned worker information; and
   a data acquirer configured to acquire a worker list of workers capable of translating the content image based on the image information and the worker information learned through the data learner,
   wherein the controller is further configured to, in response to receiving translation request information comprising at least one of an automatic translation command, task condition information, and image information from the first user terminal device, acquire the content image based on address information included in the image information, extract audio data from an image frame, and input the extracted audio data to the artificial intelligence learning model,
   wherein the artificial intelligence learning model further comprises a language recognizer configured to recognize a first language related to the input content data, and
   wherein the data acquirer is further configured to acquire a second language requested by the client from the first language recognized through the language recognizer.

7. The server of claim 6, wherein the artificial intelligence learning model further comprises a translation reviewer configured to convert the second language acquired through the data acquirer or a language corresponding to a subtitle content up dated in the storage into a language appropriate to context based on previously learned subtitle contents.

8. The server of claim 7, wherein the data acquirer is further configured to acquire a task level value of the worker who has worked on the subtitle content, by using at least one of: an error correction review result from the translation reviewer regarding the updated subtitle content, task period information on the subtitle content, and evaluation information by a user who has used the subtitle content.

9. A method for providing a subtitle service using an artificial intelligence learning model in a server, the method comprising:
   performing data communication with either or both of a first user terminal device of a client requesting translation of a content image and a second user terminal device of a worker performing the translation;
   inputting image information on the content image to the artificial intelligence learning model in accordance with a worker recommendation command of the client;
   acquiring, through the artificial intelligence learning model, a worker list of workers capable of translating the content image; and
   transmitting the acquired worker list to the first user terminal device;
   wherein the worker information comprises at least one of: profile information on each worker, a subtitle content task-completed by each worker, and task grade information evaluated for each worker,
   wherein the server comprises a controller including:

a task creator configured to, in response to receiving translation request information comprising at least one of task condition information and image information from the first user terminal device, determine as to validity of the content image based on the image information, generate task information related to the translation request information of which validity is verified, and store the task information; and a task executor configured to provide a subtitle content creating tool for a translation task for a content image related to at least one item of translation request information stored in the storage to the second user terminal device, and, in response to receiving a subtitle content on which the translation task has been completed from the second user terminal device, store the subtitle content in the storage, and wherein the image information comprises at least one of address information, title information, and description information on the content image.

10. The method of claim 9, wherein the acquiring comprises learning, through a data learner of the artificial intelligence learning model, worker information stored in the storage, classifying a translatable field category for each worker based on the learned worker information, and inputting the learned worker information and image information to a data acquirer of the artificial intelligence learning model to acquire a worker list of workers capable of translating the content image.

11. The method of claim 10, wherein the inputting further comprises:

in response to receiving translation request information comprising at least one of worker request information, task condition information, and image information, inputting the image information to the artificial intelligence learning model; and in response to receiving a command to select at least one worker included in the worker list from the first user terminal device, transmitting a task assignment message to a second user terminal device of a worker corresponding to the selection command, wherein the image information comprises at least one of address information, title information, and description information on the content image.

12. The method of claim 10, wherein the inputting further comprises:

in response to receiving translation request information comprising at least one of an automatic translation command, task condition information, and image information from the first user terminal device, acquiring the content image based on address information included in the image information to input the content image to a language recognizer of the artificial intelligence learning model; and in response to recognizing a first language related to audio data of the content image through the language recognizer, inputting the first language to the data acquirer to acquire a second language requested by the client from the first language.

13. The method of claim 12, further comprising:

converting, at a translation reviewer of the artificial intelligence learning model, the second language or a language corresponding to a subtitle content updated in the storage into a language appropriate to context based on previously learned subtitle contents.

14. The method of claim 13, further comprising:

acquiring, at the data acquirer, a task level value of a worker who has worked on the subtitle content, by using at least one of: an error correction review result from the translation reviewer regarding the updated subtitle content, task period information on the subtitle content, and evaluation information by a user who has used the subtitle content.

15. A method for controlling a server providing a subtitle service, the method comprising:

receiving translation request information comprising at least one of task condition information and image information from a first user terminal device of a client;

after determining as to validity of a content image based on the image information, storing the translation request information of which validity has been verified;

in accordance with a worker's request, transmitting a subtitle content creating tool for a translation task for the content image related to at least one item of translation request information stored in the storage to a second user terminal device of a worker; and in response to receiving a subtitle content on which a translation task has been completed from the second user terminal device, storing the subtitle content, wherein the image information comprises at least one of address information, title information, and description information on the content image, wherein the server comprises a controller including:

a task creator configured to, in response to receiving translation request information comprising at least one of task condition information and image information from the first user terminal device, determine as to validity of the content image based on the image information, generate task information related to the translation request information of which validity is verified, and store the task information; and a task executor configured to provide a subtitle content creating tool for a translation task for a content image related to at least one item of translation request information stored in the storage to the second user terminal device, and, in response to receiving a subtitle content on which the translation task has been completed from the second user terminal device, store the subtitle content in the storage, and wherein the image information comprises at least one of address information, title information, and description information on the content image.

16. The method of claim 15, wherein the storing comprises:

storing, in a temporary storage, the subtitle content on which the translation task has been completed;

in response to a request from a reviewer, transmitting, to a third user terminal device of the reviewer, a review tool for translation review for a language included in at least one subtitle content stored in the temporary storage; and in response to receiving a review completion message from the third user terminal device, storing in the final storage a subtitle content on which translation review has been completed.

17. The method of claim 15, further comprising:

registering worker information comprising profile information and task grade information on an unregistered worker; and updating the registered worker information, wherein the registering comprises:

generating the profile information comprising at least one of personal information, history information, cost information, and evaluation information on the unregistered worker; and in response to receiving a registration request command from a second user terminal device of the unregistered worker, generating task grade information of the unregistered worker by evaluating test performance of the unregistered worker, wherein the updating comprises updating the task grade information of the unregistered worker by using at least one of work period information, error correction information, and evaluation information by a user who has used the subtitle content on which the translation task has been completed by the unregistered worker.

* * * * *